United States Patent [19]

Rudzewicz et al.

[11] Patent Number: 5,381,074
[45] Date of Patent: Jan. 10, 1995

[54] SELF CALIBRATING LIGHTING CONTROL SYSTEM

[75] Inventors: Robert G. Rudzewicz, Sterling Heights; Gary B. Flaishans, Clarkston; Michael A. Dahl, Royal Oak, all of Mich.

[73] Assignee: Chrysler Corporation, Highland Park, Mich.

[21] Appl. No.: 69,480

[22] Filed: Jun. 1, 1993

[51] Int. Cl.⁶ .............................................. B60Q 7/00
[52] U.S. Cl. ......................................... 315/77; 315/82; 315/169.3; 315/308; 315/314; 307/10.8; 364/571.01
[58] Field of Search ...................... 315/77, 80, 82, 314, 315/308, 169.3, 169.4, DIG. 4; 364/424.05, 571.01, 571.02, 571.04; 307/10.8

[56] References Cited

U.S. PATENT DOCUMENTS

| | | | |
|---|---|---|---|
| 4,029,991 | 6/1977 | Schultz | 315/77 |
| 4,090,189 | 5/1978 | Fisler | 315/291 X |
| 4,219,761 | 8/1980 | Mustoe | 315/291 X |
| 4,241,294 | 12/1980 | Fisler | 315/291 |
| 4,311,994 | 1/1982 | Kuribayashi | 340/661 |
| 4,358,713 | 11/1982 | Senoo et al. | 315/291 |
| 4,358,714 | 11/1982 | Sechler et al. | 315/291 |
| 4,435,648 | 3/1984 | Goode, III | 307/10 R |
| 4,568,876 | 2/1986 | Maisch | 324/63 |
| 4,574,276 | 3/1986 | Sato | 340/661 |
| 4,578,591 | 3/1986 | Floyd et al. | 307/10 R |
| 4,613,770 | 9/1986 | Raab | 307/350 |
| 4,704,560 | 11/1987 | Mills et al. | 315/169.3 |
| 4,722,028 | 1/1988 | Brannon et al. | 362/29 |
| 4,724,375 | 2/1988 | Dittmar | 323/275 |
| 4,780,701 | 10/1988 | Eppinger | 338/196 |
| 4,868,459 | 9/1989 | Dennerlein et al. | 315/158 |
| 4,933,603 | 6/1990 | Bier | 315/77 |
| 4,935,641 | 6/1990 | Wilhelm | 307/10.8 |
| 4,949,020 | 8/1990 | Warren et al. | 315/297 |
| 4,968,917 | 12/1990 | Harris | 315/77 |
| 5,014,229 | 5/1991 | Mofachern | 364/571.04 |
| 5,047,772 | 9/1991 | Ribner | 341/156 |
| 5,049,869 | 9/1991 | Harris | 340/815.01 |
| 5,089,979 | 2/1992 | McEachern et al. | 364/571.04 |
| 5,113,120 | 5/1992 | Scott et al. | 315/77 |
| 5,134,576 | 7/1992 | Jackson et al. | 364/571.05 |

Primary Examiner—Robert J. Pascal
Assistant Examiner—Haissa Philogene
Attorney, Agent, or Firm—Wendell K. Fredericks

[57] ABSTRACT

A lighting control system with self calibration for employing the entire physical travelling range of a dimmer switch. A lookup table and linear interpolation are used in conjunction with the voltage output of the dimmer switch in order to identify the appropriate duty cycle of a Pulse Width Modulated signal which drives the lamps in the system. Two of the values in the lookup table are default minimum and maximum values of voltage which can be expected from a worst case switch device. The system dynamically determines and stores any new maximum or minimum voltage which is received from the dimmer switch. These dynamically determined minimum and maximum values are used to replace the default values in the lookup table thus calibrating the lookup table. The calibrated lookup will take into account the operating parameters of the actual switch in the vehicle and will therefore always produce a corresponding change in illumination intensity over the entire physical range of the dimmer switch.

20 Claims, 2 Drawing Sheets

SELF CALIBRATING LIGHTING CONTROL SYSTEM

FIELD OF THE INVENTION

The present invention relates generally to lighting control and, in particular, to a lighting system which calibrates the minimum and maximum output of light from a lighting device controlled by a dimmer switch.

BACKGROUND OF THE INVENTION

It has long been appreciated that the ability to adjust the brightness of the interior lights and panel/instrument displays is a desirable feature of an automotive vehicle. The use of a dimmer switch (typically a rheostat or variable resistor) on the dashboard is a commonly employed user interface for allowing control of the intensity of the light inside the vehicle. Pulse width modulation techniques have grown in popularity as the manner in which power is delivered to the lamps and other lighting devices such as electronic displays (e.g., a Vacuum Fluorescent Display (VFD)). Furthermore, the use of microprocessor based systems have become the dominant method of controlling most of the vehicle's systems, including the lighting system.

U.S. Pat. No. 4,358,713 illustrates a brightness control system in which a constant frequency oscillator circuit with a varying duty cycle is controlled by a variable resistor. The variable resistor is adjusted and set according to the brightness level desired by the operator/user. The output of the oscillator is fed to both filament lamps and a separate control circuit for the VFD. The separate control circuit produces a signal to the VFD which corresponds in frequency and duty cycle to that which is supplied to the filament lamps.

U.S. Pat. No. 4,968,917 illustrates a microprocessor based control system which uses a rheostat to adjust the brightness of the lighting devices. The direct current (DC) output of the rheostat drives the filament lamps of the interior of the vehicle. The same DC voltage is supplied to a VFD control circuit. A window of acceptable reference voltage levels is established around the DC voltage from the rheostat. The microprocessor initiates the generation of a series of discrete voltages whenever the rheostat DC voltage changes. Each discrete voltage initiated by the microprocessor is compared to the reference voltages of the window. When one of the microprocessor initiated discrete voltages falls within the window, a dimmer signal is sent to the VFD driver. The dimmer signal corresponds to the discrete voltage and it controls the duty cycle and consequent brightness of the VFD device.

In these, and other prior art systems, the maximum and minimum voltages possibly available from the system's dimmer switch are programmed, hardwired or hardcoded into a circuit or memory of the system. Since the predetermined maximum and minimum values have to take into account all possible production variations of the variable resistor (dimmer switch), any particular switch can reach its maximum or minimum voltage prior to the switch reaching the physical end of its travel.

It is one object of the invention to control the brightness of lighting devices within a vehicle.

It is one object of the invention to vary the brightness of lighting devices within a vehicle in response to the adjustment of dimmer switch.

It is further object of the invention to calibrate the variance of the brightness with respect to the physical travel limits of a variable resistor dimmer switch.

SUMMARY OF THE INVENTION

The present invention uses a dimmer switch in order to adjust the brightness of both lamps and electronic displays within a vehicle. The lamps in the system are driven by a Pulse Width Modulated (PWM) signal of a certain duty cycle. As the duty cycle increases, the brightness of the lamps increases. As the duty cycle of the PWM signal decreases, the brightness of the lamps decreases accordingly. The output voltage of the dimmer switch is used to establish the appropriate duty cycle for the PWM signal.

The method of the present invention employs a lookup table and uses linear interpolation in order to identify the appropriate duty cycle which corresponds to the voltage from the dimmer switch. Two of the values in the lookup table are the default minimum and maximum values of voltage which can be expected from the switch device. Due to tolerances in the manufacturing process for the switch device, the voltage output of the switch can vary as much as 20% from switch to switch, for the same physical position of the switch. The default values for the minimum and maximum voltages, which are stored in the lookup table, are the worst case values, such that any particular dimmer switch installed in the vehicle will cause the maximum and minimum brightness. A significant problem with using the default values is that if a particular dimmer switch performs better than the worst case situation, there will be some portion of the physical travel of the mechanical switch in which there is no corresponding change in the dimming level of the lights. Even though the switch is outputting changing voltages, the process for converting the voltage into a corresponding duty cycle will not establish a new duty cycle if the voltage falls outside of the range of the default minimum or maximum values.

In order to address this problem, the method of the present invention dynamically determines, and stores for future use, any new maximum or minimum voltage from the dimmer switch. As a new reading from the dimmer switch is processed, it is compared to the stored minimum and maximum. If the new reading exceeds or is less than the stored maximum or minimum respectively, the new reading replaces the stored maximum or minimum. These dynamically determined minimum and maximum values replace the default values in the lookup table. The next time the lookup table is used with a value that would have fallen outside of the range of the old default values, there are entries in the lookup table which encompass the new reading. In this manner, whenever the operator moves the dimmer switch, even to the physical extremes of the travel of the mechanical switch, there will be a corresponding change in the dimming level of the lamps. The method described above, with respect to the lamps in the interior of the vehicle, is also performed with respect to the dimming of the electronic displays in the vehicle.

BRIEF DESCRIPTION OF THE DRAWINGS

The features and advantages of the present invention will be more fully understood from a reading of the following detailed description with reference being made to the drawings in which.

DETAILED DESCRIPTION OF THE PREFERRED EMBODIMENT

Figure 1:
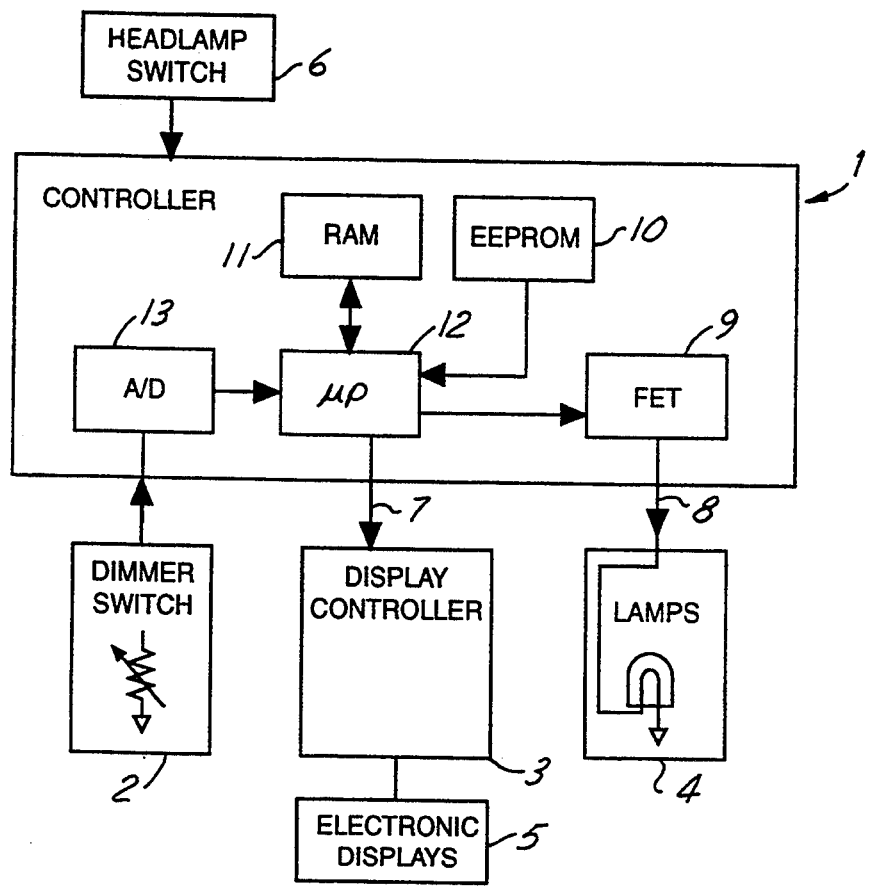
FIG. 1 is diagram illustrating the essential elements of the system.
Figure 2:
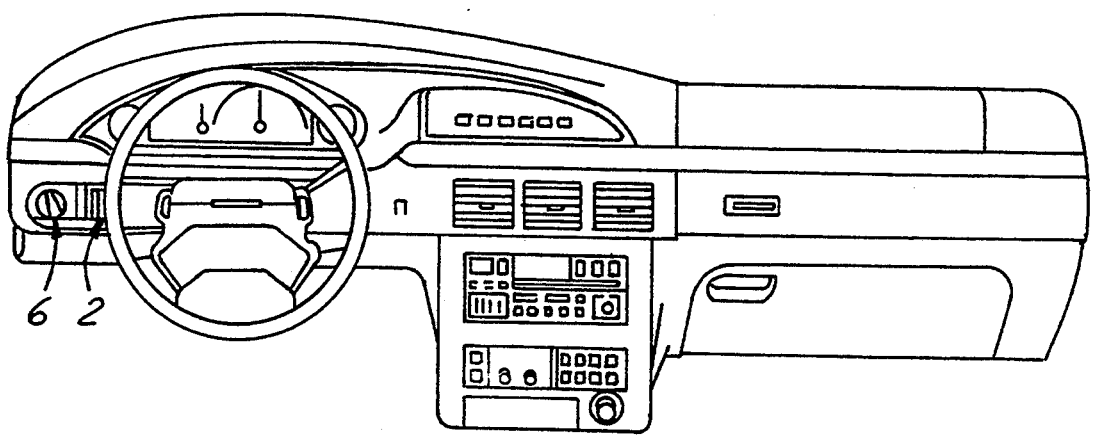
FIG. 2 illustrates the location of switches on the dashboard of a vehicle.

FIG. 1 illustrates in block diagram form, the essential elements of the lighting control system. The heart of the control system is the controller 1. Two switches, the head lamp switch 6 and the panel dimmer switch 2 are the two operator controls for the system. The display controller 3 controls the illumination of the electronic displays 5 in the vehicle. The display controller 3 receives messages from the controller 1 indicating the proper illumination level (dimming) for the electronic displays 5. The lamps 4 in the interior of the vehicle are directly driven from the controller 1. The ultimate control of the lighting system is performed by the microprocessor 12. In the preferred embodiment a Motorola 68 HCl microprocessor is used, but any suitable programmable microprocessor can be used in the system and method of the present invention. The instrument panel lighting control is determined by a combination of the head lamp switch 6 and panel dimming switch 2 positions. A preferred location on the vehicle dashboard for the two control switches is illustrated in FIG. 2.

Other than interior lighting, the bulbs 4 in the system are typically used to backlight instruments such as the climate control switches, radio, cigar lighter, etc. The electronic displays 5 are typically used for odometers, speedometers and other gauges on the instrument panel. The displays can be made from VFDs, Light Emitting Diodes (LEDs), Liquid Crystal Displays, etc.

With respect to the bulb lighting, when the head lamp switch 6 is in the Head or Park positions, the dimming level is a function of the position of the panel dimming switch 2. When the head lamp switch 6 is in the off position, the bulbs 4 are off. The bulbs 4 are driven via a 125 Hz Pulse Width Modulated (PWM) signal from the controller 1, shown in FIG. 1 to be communicated over interface 8 from the controller 1 to the lamps 4. The field effect transistor (FET) 9 is used in the system to handle the current requirements of the bulbs 4 in the vehicle. The PWM signal on interface 8 has a 10% minimum duty cycle in order to insure a minimum brightness and a 95% maximum duty cycle or maximum brightness.

With respect to the electronic display 5 lighting, when the head lamp switch 6 is in the Head or Park positions, the dimming level is, again, a function of the position of the panel dimming switch 2. In order to control the dimming of the electronic displays 5, the controller 1, sends a message to the display controller 3 over the interface 7. This message includes the information which is required to properly light and dim the electronic displays. In the preferred embodiment of the invention, the message is a value ranging between 0 and 253 (the specific values of 254 and 255 are reserved for special conditions described below). The values between 0 and 253 correspond to 254 different levels of dimming available for controlling the brightness of the electronic displays 5. The dimming message on interface 7, controlling the brightness of the electronic displays, is directly related to the PWM signal on interface 8, controlling the brightness of the bulbs 4. As the duty cycle of the PWM signal on interface 8 increases (increasing bulb 4 brightness), the message value to the display controller 3 increases. The display controller 3 utilizes the message from the controller 1 and performs the actual control of the lighting of the electronic displays 5.

In one embodiment of the present invention, when the head lamp switch 6 is in the Head or Park positions, but the output from the dimming switch 2 is below a predetermined value, the electronic displays 5 are driven to a full bright mode, called a Funeral mode. The Funeral mode of operation is designed to allow the vehicle operator to clearly view the displays in daylight conditions (e.g. during a funeral procession during the day with the head lamps turned on). The message on interface 7 used to convey the Funeral Mode to the display controller 3, is the hexadecimal value of "FE" (254 decimal). When the head lamp switch 6 is in the off position and the vehicle ignition is turned on, the electronic displays 5 are driven to full brightness. The message on interface 7 to the display controller 3 to indicate this mode is "FF" hex (255 decimal). This mode of operation overrides tile dimming switch 2 control and allows the operator to see the electronic displays 5 (such as the speedometer) during daylight conditions when the headlamps are turned off. When the head lamp switch 6 is in the off position and the vehicle ignition is turned off, the electronic displays 5 are not lit at all.

As stated previously, the preferred technique for driving the lighting in the interior of the vehicle is through the use of a Pulse Width Modulated (PWM) signal. The duty cycle of the pulses will determine the brightness of the lamps and the displays. To maintain the same level of brightness for incandescent bulbs with a PWM dimming capability as for the brightness of bulbs without PWM dimming, the RMS (root mean square) voltage output of the PWM signal should match the non-PWM dimmer direct current (DC) voltage level. The theoretical equation for the PWM Dimmer RMS voltage is given by equation (1) below:

$$PWM_{RMS} = \text{Square Root ((System Voltage)}^2 * \text{(Duty Cycle))} \quad (1)$$

The preferred system voltage is approximately 13.5 volts, but this voltage will vary in relation to the voltage delivered to the vehicle from its battery.

Figure 3:
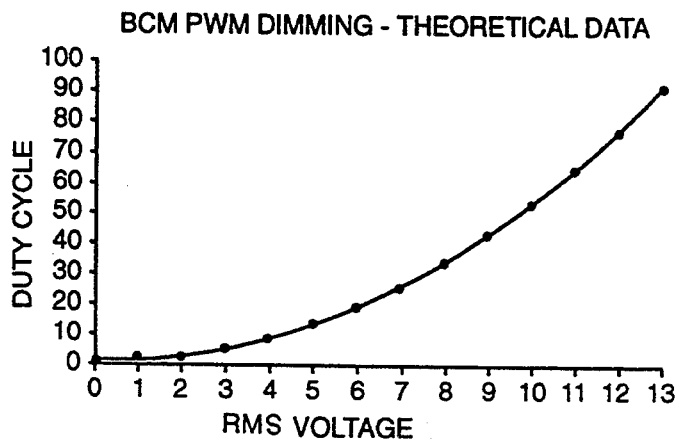
FIG. 3 depicts a graph of the duty cycle of the Pulse Width Modulated Signal plotted against system voltage.

A graph of the theoretical PWM duty cycle versus its RMS voltage is shown in FIG. 3. Looking at this figure, it can be seen that in order to obtain a RMS voltage of 10 volts for the PWM signal, the duty cycle of the signal is required to be approximately 55%.

The lighting control system employs a look-up table as part of the process of determining the duty cycle of the PWM signal. For the PWM signal, it is desirable to have 256 possible steps. The table will therefore have a minimum value of 0 and a maximum value of 255. The formula for deriving the PWM table values is illustrated in equation (2) below:

$$\text{Table Value} = \frac{\left(\dfrac{\text{Duty cycle} \times \text{Dim Output Max}}{\text{Panel Dim Min}}\right)}{(\text{Panel Dim Max} - \text{Panel Dim Min})/256} \quad (2)$$

where:
Dim Output Max=100% of timer values (16000 for 125 Hz);
Panel Dim Min=5% of timer values (1600 for 125 Hz);
Panel Dim Max=95% of timer values (15200 for 125 Hz);

$$\text{Duty cycle} = \frac{PWM^2_{RMS}}{\text{System Voltage}^2};$$

Inserting the preferred timer values into equation (2), the result is shown in equation (3) below:

$$\text{Table Value} = ((\text{Duty Cycle} \times 16000) - 1600)/53 \quad (3)$$

Utilizing equation (3), a linear interpolation look-up table can be generated for the dimmer switch voltage digital value versus PWM step (table value). The lookup table in the preferred embodiment of the present invention has only four paired X and Y entries. A full look-up table of 256 entries can be used, but such a table requires too much memory for most applications. It is more desirable to have a smaller look table and then perform a linear interpretation to obtain the desired value. The preferred lookup table has X entries of 0, 74, 184 and 255. The X entries correspond to the digital value of the dimmer switch voltage. The two numbers in the middle of the table, 74 and 184 are default values for the worst case dimmer switches (i.e. switches which output a voltage ranging from 1 to 4 volts at their physical travel extremes). The default Y entries in the lockup table are 22, 22, 255 and 255 (respectively, with respect to the previously enumerated X entries). The Y entries correspond to the PWM steps (incremental values of PWM on time). The PWM lookup table is stored in an Electrically Erasable Programmable Random Access Memory (EEPROM) 10.

There are several processes which are performed at periodic intervals in order to enable the lighting and dimming functions. The most significant of these processes are described below and are shown in pseudocode format in Tables 1-2.

1/32 Second Periodic Interval during Sleep Mode

If the vehicle ignition is one, but the head lamp switch 6 is in the off position, the system enters, or remains in, what is called a Sleep Mode with essentially no operations being performed. The one check that is performed in the Sleep Mode is to see if the head lamp switch 6 has been turned to an on position. This check is performed every 1/32 of a second. If the head lamp switch 6 has not been turned on, the system remains in the Sleep Mode. If the check reveals that the switch 6 has indeed been turned on, the Sleep Mode is exited and the Operational Mode is entered (the system is awakened). The pseudocode for the 1/32 Second Periodic Interval during Sleep Mode is depicted in Table 1 below.

TABLE 1

;-IF PANEL LAMPS ARE ON
;—WAKE UP FROM SLEEP MODE

⅛ Second Periodic Interval

The main process controlling the bulb 4 and electronic display 5 lighting and dimming is called the ⅛ second Periodic Interval. This process is described here and is illustrated in pseudocode format in Table 2.

TABLE 2

;-RESET PANEL DIMMING DELTA
;-IF PARK LAMPS ARE OFF
;—TURN OFF PANEL LAMPS AND PUT VF DISPLAYS AT DAYTIME BRIGHTNESS
;-ELSE DON'T ALLOW SLEEP MODE
;-DISABLE INTERRUPTS
;-CLEAR PWM SHORTED FLAG
;-ENABLE INTERRUPTS
;-GET DIMMING INPUT A/D READING
;-RATIO DIMMING INPUT
;-SAVE RATIOED VALUE TEMPORARILY
;-IF SELF CALIBRATION VALUES ARE ZERO
;—INITIALIZE SELF CALIBRATION VALUES TO EEPROM SETTINGS
;-ELSE IF RATIOED VALUE > CURRENT MAX VALUE
;—IF RATIOED VALUE < MAX ALLOWABLE VALUE
;——SAVE NEW VALUE IN BATTERY BACKED MEMORY
;—ELSE SKIP SELF CALIBRATION
;-ELSE IF RATIOED VALUE < CURRENT MIN VALUE
;—IF RATIOED VALUE > MIN ALLOWABLE VALUE
;——SAVE NEW VALUE IN BATTERY BACKED MEMORY
;—ELSE SKIP SELF CALIBRATION
;-ELSE COPY LINEAR INTERPOLATION TABLE FROM EEPROM TO SCRATCH RAM
;-PUT BATTERY BACKED MIN AND MAX VALUES INTO SCRATCH RAM TABLE
;-CALCULATE PWM ON TIME (PWM ON TIME = (PWM TABLE VALUE * PNLMULT) + PNLMIN
;-SAVE PWM STEP FOR CCD CALCULATION
;-IF NEW RATIOED DIM VALUE <> OLD RATIOED DIM VALUE BY AT LEAST 7 COUNTS
;—SAVE NEW VALUE AS OLD VALUE
;—CALCULATE NEW PWM VALUE
;—IF RESULT LESS THAN PWM MINIMUM ON TIME
;——LIMIT OUTPUT TO PWM MINIMUM ON TIME
;——STORE NEW PANEL PWM OUTPUT LEVEL
;—ELSE TURN ON PANEL DIMMING OUTPUT
;—IF RATIOED DIMMING LEVEL IS AT OR BELOW FUNERAL MODE VALUE
;——FORCE DISPLAY MESSAGE TO FUNERAL MODE BRIGHTNESS
;—ELSE IF CURRENT BUS MESSAGE IS FUNERAL MODE
;——FORCE BUS MESSAGE TO BE UPDATED BY CLEARING CURRENT BUS MESSAGE STORAGE
;—CALCULATE CCD DIMMING VALUE VIA INTERPOLATION INTO DIMMING TABLE
;—IF NEW CODE < DCMIN
;——ADD TO OLD DIMCODE AND DIVIDE BY 2 TO FILTER
;——IF NEW CODE NOT EQUAL TO OLD CODE
;——SEND OUT NEW CODE
;—ELSE IF DIMCODE = $00
;——FORCE DIMCODE = DIMCODET
;—ELSE IF (CCD PANEL DIMMING TARGET − CURRENT) IS POSITIVE (DIMMING INCREASE)
;——IF GREATER THAN POSITIVE WINDOW BOUNDARY
;———CALCULATE THE 1ST OF THE 4 QUARTERS OF CCD DIMMING CODE INCREASE
;—ELSE (CCD PANEL DIMMING TARGET − CURRENT) IS MINUS (DIMMING DECREASE)
;—IF GREATER THEN NEGATIVE WINDOW BOUNDARY
;———CALCULATE THE 1ST OF THE 4 QUARTERS OF CCD DIMMING CODE DECREASE
;——UPDATE PANEL DIMMING DELTA
;——UPDATE PANEL DIMMING CODE AND SEND OUT

TABLE 2-continued

NEW CODE ON CCD BUS
;—ELSE INSIDE WINDOW
;—IF CCD DIMMING CODE IS CURRENTLY DAYTIME BRIGHTNESS
;——FORCE DIMMING CODE TO TARGET VALUE
;—ELSE NO CHANGE IN PANEL DIMMING CODE TARGET
;-ELSE PARK LAMPS ARE OFF
;-CLEAR PWM SHORTED FLAG
;-TURN OFF PANEL DIMMING OUTPUT
;-CLEAR HYSTERESIS FOR DIMMING
;-IF CCD MESSAGE NOT ALREADY AT DAYTIME VALUE
;—SET CCD DIMMING CODE AND TARGET VALUE TO DAYTIME HEAD LAMPS STATE
;—QUEUE CCD DIMMING MESSAGE

If the head lamp switch 6 is turned off but the vehicle ignition is on, the duty cycle of the PWM signal on interface 8, i.e., the output of the controller 1, will be zero. Simultaneously, the controller 1 will send a message to the display controller 3 with a value of "FF" to indicate full brightness for the electronic displays 5.

If the head lamp switch 6 is in an on position (either Head or Park positions), panel dimming control is enabled. This mode allows the dimmer switch 2 to control the brightness of both the bulbs 4 and the electronic displays 5. The first operation performed by the controller when panel dimming is enabled, is to sample the analog signal from the dimmer switch 2. This analog signal is ideally in the range from 0.9 to 2.9 volts, but due to variances in the manufacturing process of the dimming switch 2, the output voltage of the switch can vary as much as plus or minus 20%. The result of this manufacturing variation is that any particular dimming switch 2 which is at its minimum setting (one of the physical extremes of the mechanical switch), can generate voltages varying from 0.1 volts to 0.9 volts. Similarly, any particular dimming switch 2 which is at its maximum setting (the other physical extreme of the mechanical switch), can generate voltages ranging from 2.1 volts to 2.9 volts. After the analog voltage from the dimmer switch 3 has been sampled, it is converted into a digital value using analog-to-digital (A/D) conversion. The A/D conversion can be performed by a separate A/D converter 13 as shown in FIG. 1, or the conversion can be performed in the microprocessor 12 itself. The digital value of the dimmer switch voltage will range from 0 to 255.

In order to accommodate varying battery voltage, which is the source of the voltage across the dimmer switch 2, the digital value of the dimmer switch voltage is rationed in proportion to the battery voltage. To accomplish this the battery voltage is first converted from its analog value into a digital value using A/D conversion, then a digital comparison is made. Determining the ratio of sampled dimmer switch voltage to battery voltage will maintain a constant dimming level regardless of varying battery voltage. The ratio is simply performed by dividing the dimmer switch voltage digital value by the battery voltage digital value. After the rationed dimmer switch voltage is determined, the next operation is to perform self calibration of the dimmer switch.

Figure 4:
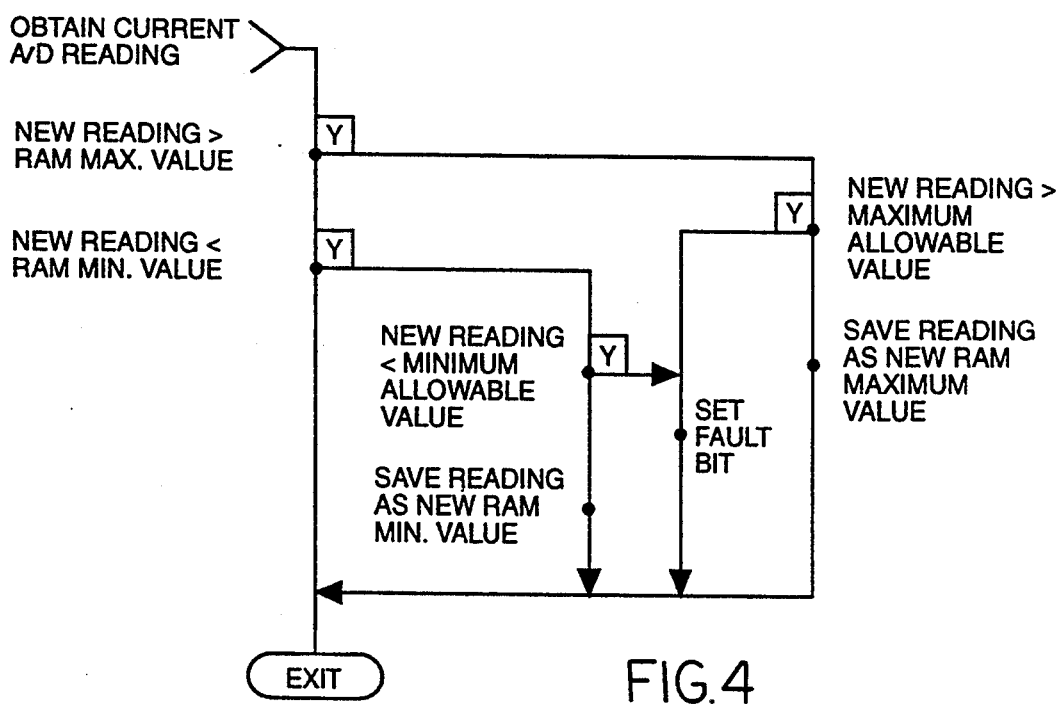
FIG. 4 is flow chart illustrating the method of self calibration of the present invention.

The method of self calibration is shown separately in a flow diagram in FIG. 4. The self calibration operation involves comparing the newly obtained dimmer switch voltage digital values to previously stored minimum and maximum values. The minimum and maximum values are stored in a battery backed Random Access Memory (RAM) 11 storage (FIG. 1). Initially, the minimum and maximum values are copied into the RAM 11 storage from the PWM lookup table in the EEPROM 10. The two values which are copied from the lookup table are the two default values in the middle of the table (not the two extreme values of 0 and 255).

In the first step in the self calibration procedure, the newly acquired dimmer switch voltage digital value is compared to the stored maximum value. If the new reading is greater than the stored maximum value, then the new reading is compared to a maximum allowable value. If it is greater than the maximum allowable value, then an error has occurred and a fault bit is set. If the new reading is less than the maximum allowable value, but still greater than the stored maximum value, the new reading is stored in the RAM 11 as the new stored maximum value. The above procedure is performed in order to use the actual maximum value which is output from the actual dimmer switch in the vehicle. As stated previously, the default minimum and maximum values in the lookup table correspond to the worst case dimmer switch. Without the above described self calibration, the operator of the vehicle can be moving the mechanical switch without any effect on the dimming of the lights. By comparing all new readings with previously stored maximum or minimum readings, it is possible to calibrate the system such that whenever the operator moves the switch, there is a corresponding change in the dimming of the lights. An example of the system with and without self calibration will be described below at the point where the advantages of self calibration are more readily apparent.

If the new reading is less than the stored maximum value, it is then compared to the stored minimum value. If it is less than the stored minimum value, it is compared to a minimum allowable value. If it is less than the minimum allowable value, then an error has occurred and a fault bit is set. If the new reading is greater than the minimum allowable value, but still less than the stored minimum value, then the new reading is stored in the RAM 11 as the new stored minimum value. Again, the above comparison allows the system to calibrate its operation, taking into account the actual characteristics of the dimmer switch installed in the vehicle.

Figure 5:
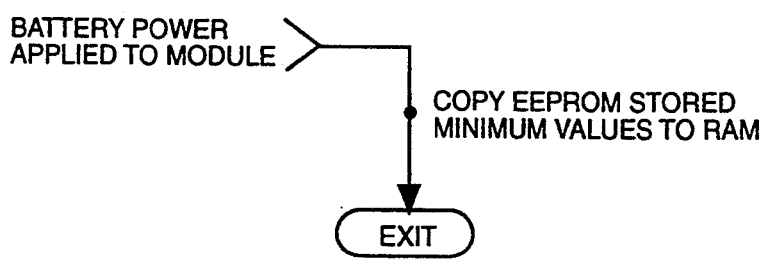
FIG. 5 is flow chart illustrating the method of restoring the default minimum and maximum switch voltage after a loss of power to the system.

If, after the comparison to both the stored minimum and stored maximum values, it is determined that the new reading from the dimmer switch falls between these two stored values, then no alteration is performed with respect to the stored values. The above described method will enable the system to perform self calibration for any dimmer switch which is installed in the vehicle. If power is withdrawn from the controller 1, the minimum and maximum values stored in RAM 11 will be lost. If this happens, the default minimum and maximum values from the EEPROM 10 are written into the RAM 11 once battery power is restored to the system as depicted in FIG. 5. If this happens, the process of self calibration is repeated as the system begins reading new samples from the dimmer switch 2.

After the self calibration operation has been performed, the new reading from the dimmer switch 6 is used to establish the duty cycle of the PWM signal which is used to drive the bulbs 4 and is also used to determine the message to the display controller which in turn drives the electronic displays 5. The first operation in establishing the appropriate duty cycle is to use the PWM look up table in order to determine the PWM step which corresponds to the digital value of the dimmer switch voltage. The PWM step is determined by using linear interpolation on values obtained from the PWM table. The interpolation is governed by the equation (4):

$$Y = \frac{Y_{LO} + (Y_{HI} - Y_{LO}) * (X - X_{LO})}{(X_{HI} - X_{LO})} \quad (4)$$

where:
Y=desired PWM step value;
X=sampled dimmer switch voltage digital value;
$X_{HI}$=the first entry in the X field which is larger than X;
$X_{LO}$=the first entry in the X field which is less than X;
$Y_{HI}$=Y value in the lookup table corresponding to $X_{HI}$; and
$Y_{LO}$=Y value in the lookup table corresponding to $X_{LO}$.

The digital value of the sampled dimmer switch voltage is used to search the lookup table for entries, $X_{HI}$ and $X_{LO}$. $X_{HI}$ is the first entry in the X field of the lookup table which is larger than the digital value of the sampled dimmer switch voltage. $X_{LO}$ is the first entry in the X field of the table which is less than digital value of the sampled dimmer switch voltage. Once $X_{HI}$ and $X_{LO}$ have been identified, the corresponding $Y_{HI}$ and $Y_{LO}$ can also be identified. These table values plus the new reading from the dimmer switch are used in equation (4) in order to linearly interpolate the PWM step- For example, if the digital value of the sampled dinner switch voltage is 135, the corresponding PWM step is 151 (using the PWM lookup table values described above). If the new reading from the dimmer switch is any value less than 74, then the PWM step will always be 22. This is to insure the minimum brightness of the bulbs and the displays. Similarly, if the new reading from the dimmer switch is any value greater than 184, the PWM step will be 255.

At this point, the advantages of the self calibration procedure previously described can be appreciated. The self calibration will, most likely, result in new values in the middle entries of the X fields of the look up table. These new values represent the actual minimum and maximum voltages as output by the dimmer switch 2. As an example: assume the maximum digital value of the dimmer switch voltage is 200. This value is the output of the switch at the physical extreme of the switch's travel. As the operator moves the switch toward this physical extreme, the digital value of the voltage is continually increasing. As the system performs the processes described above, an increasing duty cycle for the PWM signal is established, and the lights get brighter.

If there was no self calibration, once the digital value of the dimmer switch voltage reached 184 (the default maximum value in the lookup table), the process would cease to establish a greater duty cycle and the lights would remain at the same level of brightness. The result of this is that the operator would be moving the mechanical switch, without any corresponding change in the dimming level of the light. With self calibration, once the digital value of the dimmer switch voltage exceeds 184, the new digital value would be used and stored as the maximum value. The process of establishing the new maximum would continue until operator reaches the travel extreme of the dimmer switch 2, at which time the digital value of the voltage reaches its maximum of 200. At this point, the 200 value is stored in the RAM 11 as the maximum value, and is also used as the maximum in the PWM lookup table (the higher of the two middle X entries in the table).

The first time the operator moves the switch 2 to the physical extreme, the will be no change in the brightness of the lights once the switch 2 outputs a voltage greater than a digital value of 184. With the uncalibrated look up table, once the value of 184 is reached, the lights are at their maximum brightness. But, as the operator moves the switch 2 back away from the physical extreme, the newly stored maximum of 200 will effect the linear interpolation such that the duty cycle of the PWM signal will decrease and the lights will dim. If the new value of 200 had not been stored, as the operator backed off of the physical extreme, there would have been no change in the PWM duty cycle (brightness) until the switch 2 output a digital value less than 184.

With the newly stored maximum of 200, the next time the switch 2 travels to the maximum physical extreme, there will be a continual change in brightness over the entire range of travel. When the switch 2 outputs a digital value of 184, using the calibrated look up table, the duty cycle of the PWM signal will be less than that which was experienced with the uncalibrated table and the lights will be correspondingly dimmer. The same process which was described above is also performed with respect to the other physical travel extreme, where the switch 2 is at its actual minimum value. In this manner the lighting control system is calibrated to be responsive to the entire physical operating range of the actual dimmer switch 2 installed in the vehicle.

Returning to the process performed by the system, once the PWM step has been determined from the lookup table and the linear interpolation has been performed, the PWM on time (duty cycle*100% cycle) is established by equation (5) which is (derived from equation (3)):

$$PWM \text{ On Time} = (PWM \text{ step} \times 53) + 1600 \quad 5)$$

The resolution of the PWM on time being 53 microseconds.

If the digital value of the ratioed dimmer switch voltage has changed less than 7 counts from its previous PWM value (stored from the previous ratioed dimmer switch voltage), the system continues to generate a PWM signal with the same duty cycle and no new message is sent to the display controller 3. This method is used to prevent flickering of the bulbs 4.

The process for generating the message to the display controller 3 is similar to one for generating the duty cycle of the PWM signal to the lamps 4. The PWM step (digital value ranging from 22 to 255, 22 being the default minimum brightness) is used as an input to a second lookup table. This second lookup table has X entries corresponding to duty cycle and Y entries corresponding to dimming messages. There are 253 possible dimming steps for transmission to the display controller 3, the values $FE and $FF being saved for the special conditions described above. Using the PWM step, the adjacent X and Y entries are identified and using these values, a linear interpolation is performed to determine the message to be sent to the display controller 3. In this manner, the dimming level to the electronic displays 5 is kept proportional to the dimming level of the lamps 4.

Having thus described the present invention, it is to be understood that the above described methods (apparatus) are illustrative of the principles of the present invention, and that other methods (apparatuses) may be devised by those skilled in the art without departing from the spirit and scope of the invention.

We claim:

1. A method of controlling illumination intensity of lighting devices in a lighting system having a potentiometer dimmer switch, said method comprising:

reading a voltage from said dimmer switch;

comparing said dimmer voltage to a self calibration maximum voltage, said self calibration maximum voltage being stored in a first memory location of said system;

replacing said self calibration maximum voltage in said first memory location with said dimmer voltage if said dimmer voltage is greater than said self calibration maximum voltage;

comparing said dimmer voltage to a self calibration minimum voltage, said self calibration minimum voltage being stored in a second memory location of said system;

replacing said self calibration minimum voltage in said second memory location with said dimmer voltage if said dimmer voltage is less than said self calibration minimum voltage;

extracting a maximum illumination intensity data from a third memory location;

extracting a minimum illumination intensity data from a fourth memory location;

interpolating an illumination intensity level, using said self calibration maximum and minimum voltages stored in said first memory location and said second memory location, said maximum and said minimum illumination intensity data, and said dimmer voltage;

generating an illumination control signal based upon said illumination intensity level; and transmitting said illumination control signal to said lighting devices to control illumination of said lighting devices in proportion thereto.

2. A method according to claim 1 further comprising:
   copying a default maximum voltage stored in a fifth memory location to said first memory location if said self calibration maximum voltage is zero.

3. A method according to claim 2 further comprising:
   copying a default minimum value stored in a sixth memory location to said second memory locations if said self calibration minimum voltage is zero.

4. A method according to claim 1 wherein said illumination control signal is a Pulse Width Modulated (PWM) signal.

5. A method according to claim 4 wherein said illumination intensity level is related to an "on time" for pulses of said PWM signal, and wherein said illumination intensity data is PWM step data.

6. A method according to claim 5 wherein said determining step comprises:
   linearly interpolating a resultant PWM step value using said voltage data, said PWM step data and said dimmer voltage.

7. A method according to claim 6 further comprising:
   multiplying said PWM step value by a conversion multiplier in order to obtain an intermediate "on time" for the pulses of said PWM signal; and
   adding a minimum "on time" pulse width to said intermediate "on time" pulse width in order to obtain said "on time" for said PWM signal.

8. A method according to claim 6 wherein said third and fourth memory locations are part of a first lookup table and further comprising:
   using said PWM step value as an input to a second lookup table;
   extracting an intensity sessage from said second lookup table; and
   transmitting said intensity message to electronic displays in said lighting system.

9. A method according to claim 1 further comprising:
   converting said dimmer voltage to a digital value after said reading step.

10. A method according to claim 9 further comprising:
    generating said dimmer switch voltage from a battery voltage of said system;
    reading said battery voltage of said system;
    converting said battery voltage to a digital value; and
    dividing said digital value of said dimmer voltage by said digital value of said battery voltage.

11. A lighting system for controlling illumination intensity comprising:

a potentiometer dimmer switch, said dimmer switch generating a dimmer voltage;

a first controller having a microprocessor and at least one memory, said first controller having as an input said dimmer voltage from said dimmer switch, said first controller having as an output an illumination intensity signal;

at least one illumination device, said illumination device having as an input said illumination intensity signal;

a first memory location in said at least one memory, said first memory location containing a self calibration maximum voltage;

a second memory location in said at least one memory, said second memory location containing a self calibration minimum voltage;

a means for replacing said self calibration maximum voltage in said first memory location with said dimmer voltage if said dimmer voltage is greater than said self calibration maximum voltage;

a means for replacing said self calibration minimum voltage in said first memory location with said dimmer voltage if said dimmer voltage is less than said self calibration minimum voltage;

a third memory location in said at least one memory, said third memory location containing a maximum intensity data;

a fourth memory location in said at least one memory, said forth memory location containing a minimum intensity data; and a means for determining said illumination intensity signal using said self calibration maximum voltage, said self calibration minimum voltage, said maximum intensity data, said minimum intensity data, and said dimmer voltage.

12. A system according to claim 11 further comprising:
    a display controller;
    at least one electronic display connected to said display controller;
    a means in said first controller for determining an intensity message based on said illumination intensity signal; and a means for transmitting said intensity message from said first controller to said display controller.

13. A system according to claim 12 wherein said third and fourth memory locations are part of a first lookup table and said means for determining an intensity message comprises:
a second lookup table in said at least one memory; and
a linear interpolation means for obtaining said intensity message from said second lookup table using said illumination intensity signal as an input.

14. A system according to claim 11 wherein said illumination intensity signal is a Pulse Width Modulated signal.

15. A method according to claim 1 further comprising:
comparing said dimmer voltage to an absolute maximum voltage; said absolute maximum voltage being stored in a seventh memory location;
generating a fault signal if said dimmer voltage is greater than said absolute maximum voltage.

16. A method according to claim 15 further comprising:
comparing said dimmer voltage to an absolute minimum voltage; said absolute minimum voltage being stored in an eighth memory location;
generating a fault signal if said dimmer voltage is less than said absolute minimum voltage.

17. A method according to claim 3 wherein said third, fourth, fifth and sixth memory locations are part of a first lookup memory.

18. A method according to claim 3 further comprising:
comparing said dimmer voltage to an absolute maximum voltage; said absolute maximum voltage being stored in a seventh memory location;
generating a fault signal if said dimmer voltage is greater than said absolute maximum voltage;
comparing said dimmer voltage to an absolute minimum voltage; said absolute minimum voltage being stored in an eighth memory location;
generating a fault signal if said dimmer voltage is less than said absolute minimum voltage.

19. A method according to claim 18 wherein said third, fourth, fifth, sixth, seventh and eighth memory locations are part of a first lookup memory.

20. A method according no claim 1 further comprising skipping the steps of comparing said dimmer voltage to a self calibration minimum voltage and replacing said self calibration minimum voltage, whenever said dimmer voltage is greater than said self calibration maximum voltage.

* * * * *